UNITED STATES PATENT OFFICE.

C. FRITZ ASCHE, OF HAMBURG, GERMANY.

IMPROVEMENT IN TROCHES.

Specification forming part of Letters Patent No. 204,520, dated June 4, 1878; application filed December 20, 1877.

*To all whom it may concern:*

Be it known that I, C. F. ASCHE, of the city of Hamburg, in the Empire of Germany, have invented a new and useful Medical Compound, which is fully described in the following specification.

My invention consists in the incorporation of cubebs, anise, feuchel, pimpinella, and ipecacuanha into a lozenge composed generally of the following ingredients and in the proportions as set forth:

I take to about two hundred (200) parts of powdered white sugar, to which solutions of starch and gum-tragacanth are added sufficient to mold into form, fifteen (15) parts of powdered cubebs, (cubeba;) one and two-tenths ($1\frac{2}{10}$) parts of anise, (anisum,) powdered; one and two-tenths ($1\frac{2}{10}$) parts of powdered feuchel, (fœniculum;) one and two-tenths ($1\frac{2}{10}$) parts of powdered saxifraga, (pimpinella,) and about one (1) part of powdered ipecacuanha.

These are combined into lozenges of convenient shape and size, and will be found very useful as an internal remedy for all affections of the throat and lungs, as well as for all complaints of the throat caused by a cold or unusual exertion of the vocal organs.

I am aware that cubebs, anise, and ipecac, either separate or combined, have been incorporated into lozenges; but

What I claim as my invention, and desire to secure by Letters Patent, is—

A lozenge composed of cubebs, anise, feuchel, pimpinella, ipecac, sugar, and the necessary gums to form the lozenge, in about the proportions and for the purposes hereinbefore set forth and described.

C. F. ASCHE.

Witnesses:
HENRY E. ROEDER,
HERMANN HEINTZ.